United States Patent [19]

Inokuchi et al.

[11] Patent Number: 4,797,799

[45] Date of Patent: Jan. 10, 1989

[54] POWER CONVERTER

[75] Inventors: Haruhisa Inokuchi, Kunitachi; Takami Sakai, Tokorozawa, both of Japan

[73] Assignee: Kabushiki Kaisha Toshiba, Kawasaki, Japan

[21] Appl. No.: 154,312

[22] Filed: Feb. 10, 1988

[30] Foreign Application Priority Data

Feb. 13, 1987 [JP] Japan .................................. 62-31061

[51] Int. Cl.[4] ............................................. H02M 5/45
[52] U.S. Cl. ...................................... 363/37; 363/79
[58] Field of Search .................... 363/35, 37, 79, 87, 363/96

[56] References Cited

U.S. PATENT DOCUMENTS

| | | | |
|---|---|---|---|
| 3,906,335 | 9/1975 | Watanabe et al. | 363/79 |
| 4,210,956 | 7/1980 | Watanabe | 363/37 |
| 4,264,951 | 4/1981 | Konighi et al. | 363/35 |
| 4,307,442 | 12/1981 | Yano et al. | 363/37 |
| 4,494,179 | 1/1985 | Inokuchi et al. | 363/35 |
| 4,517,634 | 5/1985 | Sakai | 363/79 |
| 4,555,750 | 11/1985 | Matsumura et al. | 363/96 |
| 4,578,743 | 3/1986 | Inokuchi et al. | 363/35 |
| 4,598,350 | 7/1986 | Sakai et al. | 363/37 |
| 4,680,691 | 7/1987 | Yoshino et al. | 363/35 |
| 4,727,466 | 2/1988 | Sakai | 363/79 |

FOREIGN PATENT DOCUMENTS 61-12457 4/1986 Japan .

*Primary Examiner*—Patrick R. Salce
*Assistant Examiner*—Jeffrey Sterrett
*Attorney, Agent, or Firm*—Oblon, Fisher, Spivak, McClelland, & Maier

[57] ABSTRACT

A power converter device that interchanges power between a first A. C. system and a second A. C. system, including an externally commutated power converter controlled such that the D. C. voltage of a D. C. line tracks a reference value, a voltage type self-commutated power converter which converts the output D. C. power of the externally commutated power converter to A. C. power under pulse width control and supplies the converted A. C. power to the second A. C. system, interchange power control means for controlling the phase difference angle of the voltage on the A. C. side of the voltage type self-commutated power converter and the voltage of the second A. C. system such that the interchange power tracks a reference value, and reactive power control means for controlling the control factor of the pulse width control such that the reactive power generated by the voltage type self-commutated power converter tracks another reference value.

4 Claims, 6 Drawing Sheets

POWER CONVERTER

BACKGROUND OF THE INVENTION

1. Field of the Invention

This invention relates to a power converter that interchanges power between a first A.C. system and a second A.C. system.

2. Description of the Background

The construction of known power converter of the above-noted type, shown in FIG. 10 includes a main circuit in which the D.C. sides in each case of an externally commutated converter 5A that performs a A.C. to D.C. converter action and an externally commutated converter 5B that performs a D.C. to A.C. converter action are connected through D.C. reactors 4A and 4B and a D.C. line 8, while the A.C. sides in each case of externally commutated converters 5A and 5B are connected through respective converter transformers 3A and 3B and circuit breakers 2A and 2B to A.C. systems 1A and 1B. Externally commutated converters 5A and 5B are constructed for example as shown in FIG. 11 by connecting six thyristors 5U, 5V, 5W, 5X, 5Y, and 5Z in six arms in a three-phase bridge arrangement.

The control device that controls externally commutated converters 5A and 5B consists of an interchange power control system provided for converter 5A and a margin angle control system provided for converter 5B, their functions being respectively allocated to these two externally commutated converters.

The interchange power control system is equipped with an interchange power control circuit (APC) 41 that outputs a D.C. current reference value $I_{dp}$ that is necessary to result in an active interchange power $P_d$ detected by an active power detector 22. Detector 22 determines interchange power from the voltage and current extracted through a potential transformer 13 and A.C. transformer 14 on the system side of the transformer 3B on the side of converter 5B whereby it can be determined whether the detected interchange power coincides with the interchange power reference value $P_{dp}$ set by an interchange power setting device 31. The actual D.C. current $I_d$ of D.C. line 8 is detected by D.C. current transformer 11A and D.C. current detector 21A. Converter 5A is controlled by means of D.C. current control circuit (ACC) 42, phase control circuit (PHS) 43A and pulse amplification circuit (PA) 44A so that current $I_d$ of D.C. line 8 coincides with D.C. current reference value $I_{dp}$ mentioned above.

A specific example of the construction of interchange power control circuit 41 is shown in FIG. 12. In the interchange power control circuit 41 of FIG. 12, the deviation between the active detected power value $P_d$ found by active power detector 22 and the interchange reference power value $P_{dp}$ set by interchange power setting device 31 is found by adder 412, amplified by interchange power regulator (APR) 411, and the D.C. current reference value $I_{dp}$ for controlling the interchange power is thereby formed. It should be noted that the D.C. voltage in a power converter of this type is held practically constant, so using the D.C. voltage reference value $E_{dp}$ corresponding to steady operation, as shown in interchange power control circuit 41A of FIG. 13, the calculation $P_{dp}/E_{dp}$ consisting of dividing the interchange power reference value $P_{dp}$ as set by interchange power setting device 31 by the D.C. voltage reference value $E_{dp}$ as set by D.C. voltage setting device 32 is performed by divider 413. The D.C. current reference value $I_{dp}$ is created by adding the output signal of divider 413 to the output signal of interchange power regulator 411, using adder 414.

A specific example of the construction of the D.C. current control circuit 42 is shown in FIG. 14. As can be there seen, in the control circuit 42, the deviation between the D.C. current detected value $I_p$ found by the D.C. current detector 21A and the D.C. current reference value $I_{dp}$ produced by the interchange power control circuit 41 is determined by adder 422. This deviation is amplified by D.C. current regulator (ACR) 421, and its output signal is fed to phase control circuit 43A.

Phase control circuit 43A controls the firing timing of converter 5A by means of pulse amplification circuit 44A, as already described, by determining the control delay angle of externally commutated converter 5A in accordance with the output signal of D.C. current control circuit 42.

The margin angle control system controls the firing timing of converter 5B by means of pulse amplification circuit 44B, by determining control advance angle $\gamma$ from a margin angle control circuit (A$\gamma$C) 45 and phase control circuit 43B. such as to maintain a margin angle, in order to avoid failure of commutation of externally commutated converter 5B that carries out the D.C. to a A.C. conversion action. The construction of margin angle control circuit 45 itself may be, for example, as described in published Japanese patent publication No. 46956/1983, so a detailed description is omitted here.

With the above construction, the D.C. voltage of the power converter device is determined with a margin angle being maintained at externally commutated converter 5B, and stable operation of the power converter device is continued by controlling the D.C. current at externally commutated converter 5A for interchange power control. This method of control is disclosed in, for example, Japanese patent application laid-open No. 107443/1975.

In the conventional device constructed as above-described, even though the interchange power between the two A.C. system could be controlled, the reactive power could not be controlled. Or, if the reactive power was to be controlled, the construction became difficult and complicated.

SUMMARY OF THE INVENTION

Accordingly, a first object of this invention is to provide a new and improved power converter device that effects interchange of power between A.C. systems and wherein both control of the interchange power and control of the reactive power can be achieved.

A second object of this invention is to provide a novel power converter device that can easily be expanded to a multi-terminal system by the provision of additional equipment at the D.C. transmission system power converter, conventionally constructed by an externally commutated power converter.

These and other objects are achieved according to the invention by providing a novel power converter device that is capable of stably controlling interchange of power in both directions by controlling the reactive power by control factor control whilst controlling interchange power by phase angle control of a voltage type self-commutated power converter provided at one end of the system and controlling the D.C. voltage by a converter at the other end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
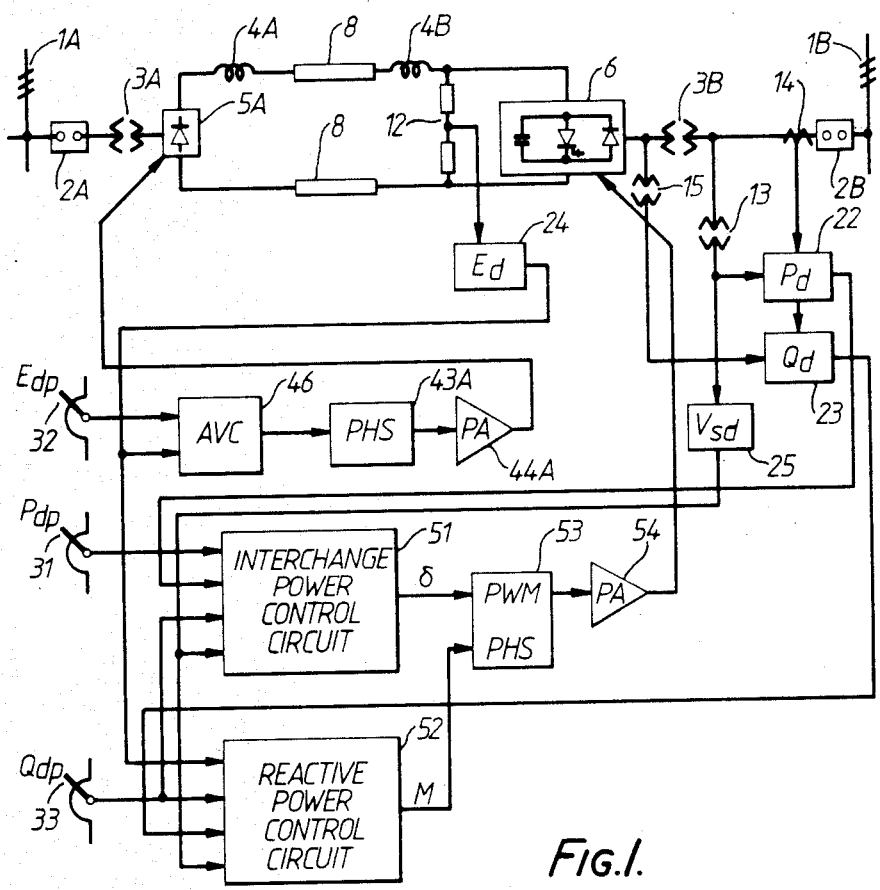
FIG. 1 is a schematic block diagram of the system layout of the main circuit and of a control device according to an embodiment of this invention.
Figure 10:
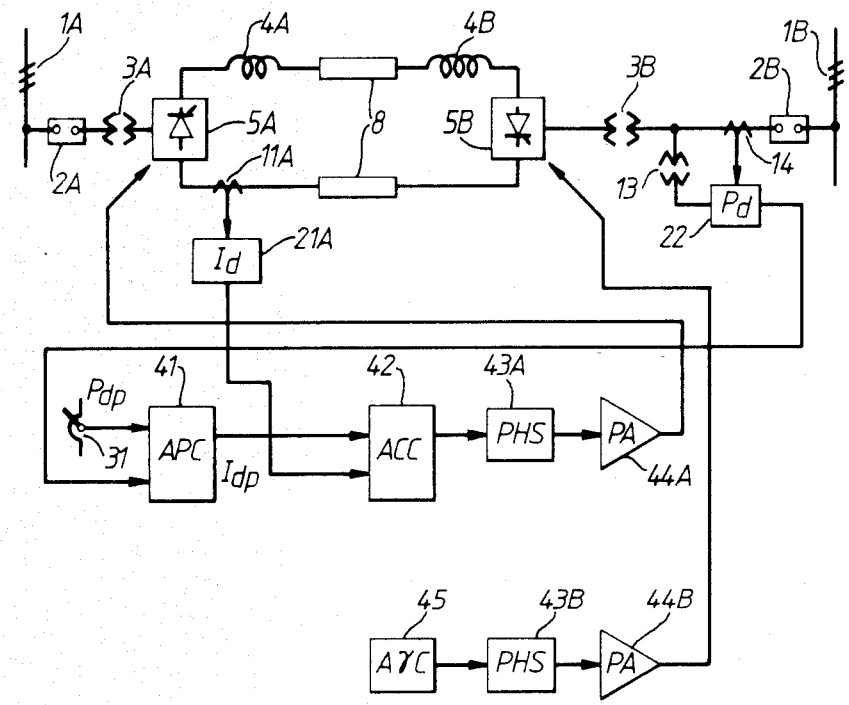
FIG. 10 is a schematic block diagram of the system layout of the main circuit and of the control device in a conventional device.
Figure 11:
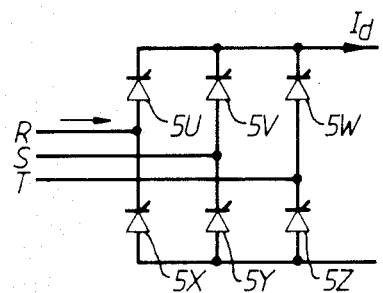
FIG. 11 is a circuit diagram of the externally commutated power converter in FIG. 10.
Figure 12:
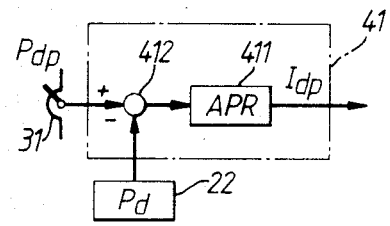
FIG. 12 is a block diagram of the interchange power control circuit in FIG. 11.
Figure 13:
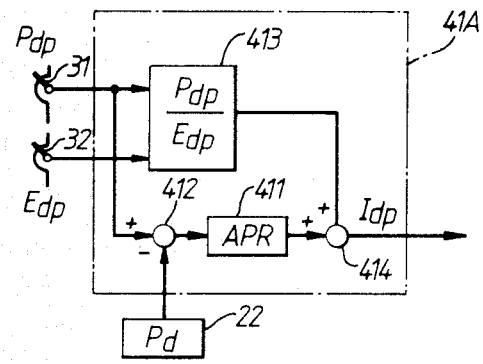
FIG. 13 is a block diagram showing a further example of the construction of the interchange power control circuit.
Figure 14:
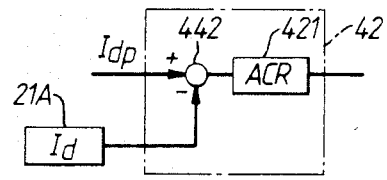
FIG. 14 a block diagram of the D.C. current control circuit in FIG. 11.

Referring now to the drawings, wherein like reference numerals designate identical or corresponding parts throughout the several views, the layout of the main circuit of a power converter device constructed according to this invention, and of its control device, are shown in FIG. 1. Since those items which perform the same function as those described in the conventional examples of FIG. 10 et seq. are given the same reference numerals, the description thereof will not be repeated here.

Figure 2:
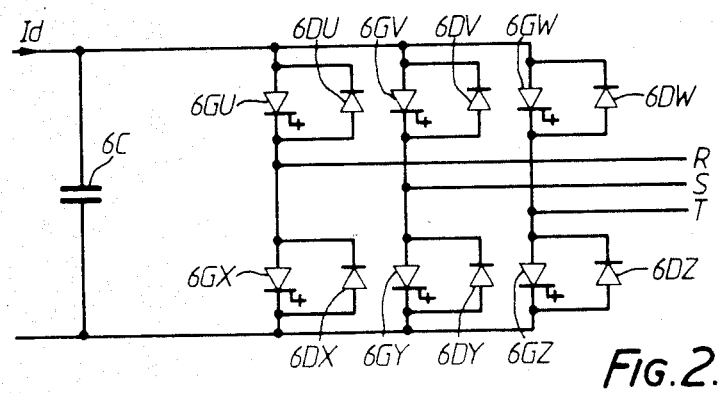
FIG. 2 is a block diagram of the voltage type self-commutated power converter shown in FIG. 1.

In the main circuit of FIG. 1, as the converter which performs the D.C. and A.C. conversion action at the B end, there is provided a voltage type self-commutated power converter 6 whose pulse width can be controlled. This voltage type self-commutated power converter 6 is constructed, for example, as shown in FIG. 2 by connecting six GTO elements (gate turn-off thyristor elements) 6GU, 6GV, 6GW, 6GX, 6GY, and 6GZ in a three-phase bridge arrangement. Each of these GTO elements is connected in parallel with a respective diode 6DU, 6DV, 6DW, 6DX, 6DY, and 6DZ connected in inverse polarity. A capacitor 6C is connected in parallel with this whole arrangement on the D.C. side.

Externally commutated power converter 5A that performs the A.C. to D.C. converter action is provided with a D.C. voltage control circuit 46.

Figure 3:
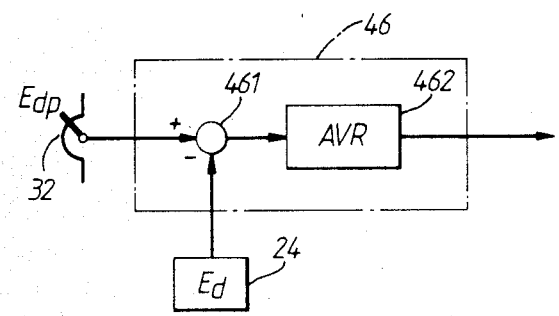
FIG. 3 is a block diagram of the D.C. voltage control circuit in FIG. 1.

D.C. voltage control circuit 46 may be constructed for example as shown in FIG. 3. In the device of FIG. 3, the deviation between the D.C. voltage reference value set by the D.C. voltage setting device 32 and the D.C. voltage detected value $E_d$ detected by D.C. voltage detector 24 is obtained by adder 461, and a control signal such as to make this deviation zero is output by D.C. voltage regulator (AVR) 462. Externally commutated power converter 5A is controlled by the output signal of this D.C. voltage regulator 462 by means of phase control circuit 43A and pulse amplification circuit 44A.

As a voltage type self-commutated power converter 6 that performs the D.C. to A.C. converter action, there are provided an interchange power control circuit 51 that controls the interchange power and a reactive power control circuit 52 for controlling the reactive power of the converter itself. Interchange power control circuit 51 calculates a phase difference angle $\delta$ from interchange power detected value $P_d$, interchange power reference value $P_{dp}$, reactive power reference value $Q_{dp}$ of voltage type self-commutated power converter 6, and A.C. voltage detected value $V_{sd}$ of A.C. system 1B. Interchange power detected value $P_d$ is detected by active power detector 22. Interchange power reference value $P_{dp}$ is set by interchange power setting device 31. Reactive power reference value $Q_{dp}$ is set by reactive power setting device 33. A.C. voltage detected value $V_{sd}$ is detected by A.C. voltage detector 25. Reactive power control circuit 52 calculates a control factor M from reactive power detected value $Q_d$ of voltage type self-commutated power converter 6, reactive power reference value $Q_{dp}$, D.C. voltage detected value $E_d$, and A.C. voltage detected value $V_{sd}$. Reactive power detected value $Q_d$ is detected by reactive power detector 23. D.C. voltage detected value $E_d$ is detected by D.C. voltage detector 24.

Figure 7:
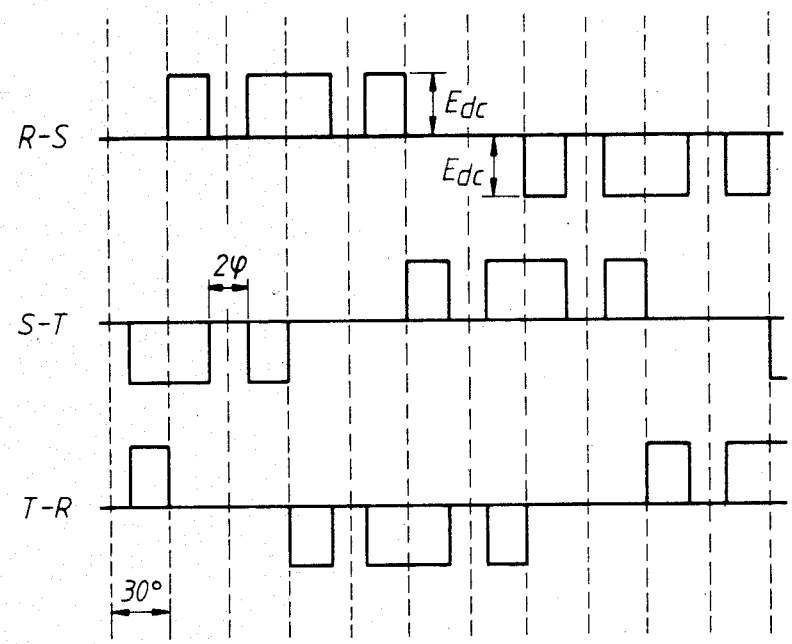
FIG. 7 is a waveform timing diagram showing an example of the output voltage waveform of the pulse width controlled voltage type self-commutated power converter.

Pulse width phase control circuit 53 generates a gate timing signal for pulse width control based on the phase difference angle found by interchange power control circuit 51 and control factor M found by reactive power control circuit 52. An example of this gate timing signal is shown in FIG. 7. As shown in FIG. 7, the fundamental component of the output voltage of voltage type self-commutated power converter 6 has a waveform that is advanced in phase by a phase difference angle $\delta$ with respect to the A.C. voltage of A.C. system 1B and in which the period $2\phi$ for which the voltage is zero varies in accordance with the relationship: $M=(1-2\sin\phi)$, depending on the control factor M. Voltage type self-commutated power converter 6 is controlled by the gate timing signal that is output from pulse width phase control circuit 53 by means of on-off pulse amplification circuit 54 so as to output a voltage of the waveform shown in FIG. 7.

Figure 4:
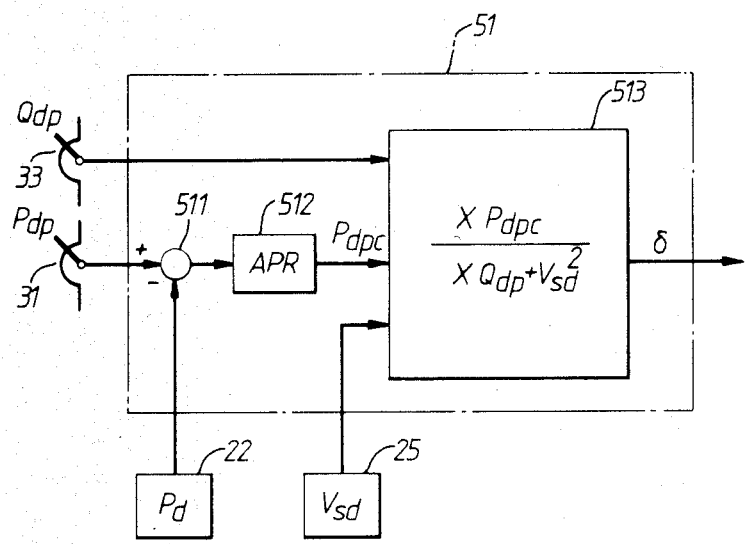
FIG. 4 is a block diagram of the interchange power control circuit in FIG. 1.
Figure 5:
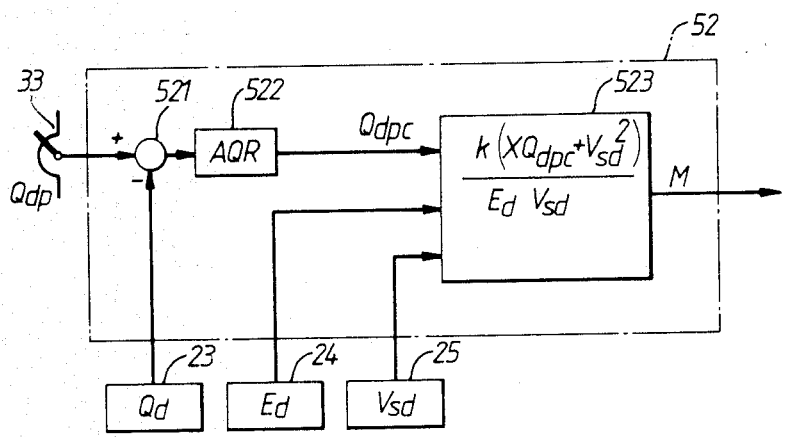
FIG. 5 is a block diagram of the reactive power control circuit in FIG. 1.

A specific example of the construction of interchange power control circuit 51 is shown in FIG. 4 and a specific example of the construction of reactive power control circuit 52 is shown in FIG. 5.

In interchange power control circuit 51, as shown in FIG. 4, the deviation between the interchange reference power value $P_{dp}$ set by interchange power setting device 31 and the active detected power value $P_d$ found by active power detector 22 is obtained by adder 511.

Interchange power regulator 512 outputs an interchange power control signal $P_{dpc}$ such as to make this deviation zero. This interchange power control signal $P_{dpc}$, the reactive power reference value $Q_{dp}$ set by reactive power setting device 33, and the A.C. voltage $V_{sd}$ detected by A.C. voltage detector 25 are fed to phase difference angle calculating circuit 513. This phase difference angle calculating circuit 513 calculates the phase difference angle $\delta$ from these input signals and the reactance X (for example, the reactance of converter transformer 3B) between voltage type self-commutated power converter 6 and A.C. system 1B, using the following equation:

$$\delta = \tan^{-1}(X \cdot P_{dpc}/(X \cdot Q_{dp} + V_{sd}^2)) \tag{1}$$

In reactive power control circuit 52, a reactive power control signal $Q_{dpc}$ is obtained, as shown in FIG. 5, from the deviation between the reactive power reference value $Q_{dp}$ set by reactive power setting device 33 and the reactive power detected value $Q_d$ detected by reactive power detector 23, through reactive power regulator 522. Reactive power control signal $Q_{dpc}$, D.C. voltage $E_d$ detected by D.C. voltage detector 24, and A.C. voltage $V_{sd}$ detected by A.C. voltage detector 25 are fed to control factor calculating circuit 523. Control factor calculating circuit 523 computes control factor M from input signals and reactance X, using the following equation:

$$M = k(X \cdot Q_{dpc} + V_{sd}^2)/(E_d \cdot V_{sd}) \tag{2}$$

Before describing the operation of the shown in FIG. 1, a general description will be given.

Figure 8:
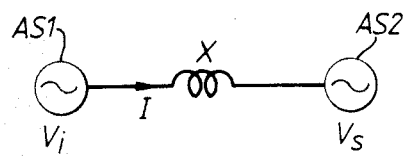
FIG. 8 is a circuit diagram showing the principles of construction of a power system to which this invention is applied.
Figure 9:
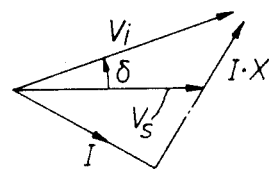
FIG. 9 is a vector diagram of the power system of FIG. 8.

As shown in FIG. 8, if there are two A.C. systems AS1 and AS2 of voltages $V_i$ and $V_s$, let us assume that these two A.C. systems are connected through a reactance X. As is well known, if the vector diagram which is then obtained is as shown in FIG. 9, where I is the current from A.C. system AS1 and $\delta$ is the phase angle difference between the two A.C. voltages, the active power P and reactive power Q are given by the following equations:

$$P = (V_s \cdot V_i \sin\delta)/X \tag{3}$$

$$Q = (V_s^2 - V_s \cdot V_i \cos\delta)/X \tag{4}$$

If we let the voltage $V_i$ be the output voltage of the voltage type self-commutated power converter, and if we let the reactance of converter transformer 3B in the case of voltage type self-commutated power converter 6 in FIG. 1 with respect to A.C. system 1B be X, active power P and reactive power Q as expressed by the above equations (3) and (4) are generated.

If we now take as one example an output voltage whose waveform is pulse width controlled as shown in FIG. 7, the fundamental component of this voltage is:

$$V_i = M \cdot k \cdot E_{dc} \tag{5}$$

Where $E_{dc}$ is the value of the D.C. voltage, M is the control factor, and k is a constant, these being given by:

$$M = (1 - 2\sin\phi) \tag{6}$$

$$k = \sqrt{6}/\pi \tag{7}$$

From equations (3) and (4), the phase difference angle is:

$$\delta = \tan^{-1}(X \cdot P/(V_s^2 + X \cdot Q)) \tag{8}$$

From equations (4) and (5):

$$M = (V_s^2 + X \cdot Q)/(k \cdot E_{dc} \cos\delta) \tag{9}$$

Thus, in this invention, the voltage of D.C. line 8, i.e., the D.C. voltage $E_d$, is controlled by D. C. voltage control circuit 46 provided in externally commutated power converter 5A so as to track the D.C. voltage set value $E_{dp}$. Phase difference angle $\delta$ is found by interchange power control circuit 51 by carrying out the calculation of equation (1). Control factor M is found by reactive power control circuit 52 by carrying out the calculation of equation (2). Phase difference calculating circuit 513 of interchange power control circuit 51 calculates phase difference angle $\delta$ and control is performed such that voltage type self-commutated power converter 6 generates interchange power $P_{dpc}$ whilst reactive power is being generated. That is to say, the interchange power $P_{dpc}$ is the output of interchange power regulator 512, so by means of the action of this interchange power regulator 512, operation is carried out with the phase difference angle $\delta$ controlled such that the interchange power of voltage type self-commutated power converter 6 tracks interchange power reference value $P_{dp}$.

In contrast, as will be clear from equation (5), control factor M corresponds to the output voltage of voltage type self-commutated power converter 6. Reactive power control circuit 52 controls the output voltage of voltage type self-commutated power converter 6, i.e., the control factor M, so that operation is performed with its reactive power tracking the reactive power reference value $Q_{dp}$.

In this way, control of the interchange power between the A.C. systems and control of the reactive power can be achieved at the same time.

In the embodiment described above, the phase difference angle $\delta$ was calculated by equation (1), but when the value of the phase difference angle $\delta$ is small, in general mathematically the following equation (10) holds, so calculation can be carried out using this equation (10).

$$\delta = X \cdot P_{dpc}/(X \cdot Q_{dp} + V_{sd}^2) \tag{10}$$

Further, while in the above embodiment the reactive power reference value $Q_{dp}$ was used to find the phase difference angle $\delta$, clearly the calculation could be performed using the output of reactive power regulator 522, i.e., signal $Q_{dpc}$.

Figure 6:
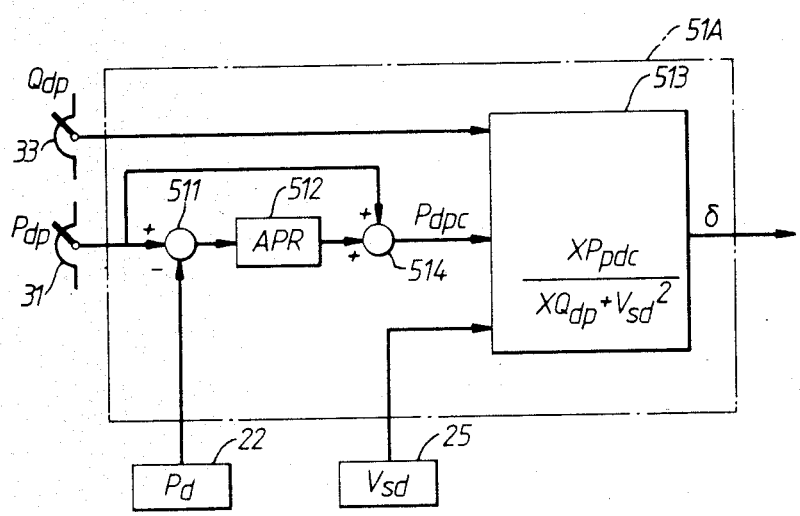
FIG. 6 is a block diagram showing a modification of the interchange power control circuit.

As the formula for calculation of the phase difference angle, from equation (3), $$\delta = \sin^{-1}((V_s \cdot V_i)/(X \cdot P))$$

so, transforming this, we obtain:

$$\delta = \sin^{-1}((V_{sd} \cdot M \cdot k \cdot E_d)/(X \cdot P_{dpc})) \tag{11}$$

or $$\delta = (V_{sd} \cdot M \cdot k \cdot E_d)/(X \cdot P_{dpc}) \quad (12)$$

whereby the phase difference angle can be calculated. Apart from the construction shown in FIG. 4, interchange power control circuit 51 can be made to have a feed-forward function by the addition of an adder 514 as shown in FIG. 6, so that it has quick response to changes in the interchange power reference value.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converter device that interchanges power between a first A.C. system and a second A.C. system, comprising:
    an externally commutated power converter which converts A.C. power supplied from the first A.C. system to D.C. power on a D.C. line;
    a voltage type self-commutated power converter which converts the output D.C. power of said externally commutated power converter to A.C. power under pulse width control and supplies the converted A.C. power to the second A.C. system, said D.C. line effecting electrical coupling between said externally commutated power converter and said voltage type self-commutated power converter;
    D.C. voltage control means for determining the control angle of said externally commutated power converter such that the D.C. voltage of said D.C. line tracks a first reference value;
    interchange power control means for controlling the phase difference angle of the voltage on the A.C. side of said voltage type self-commutated power converter and the voltage of the second A.C. system such that the interchange power between the first A.C. system and the second A.C. system tracks a second reference value; and
    reactive power control means for controlling the control factor of the pulse width control such that the reactive power generated by said voltage type self-commutated power converter tracks a third reference value.

2. A power converter device according to claim 1, wherein the interchange power control means uses the second reference value, the reactive power generated by the voltage type self-commutated power converter, a detected voltage of the second A.C. system, and a reactance between said voltage type self-commutated power converter and second A.C. system to calculate the phase difference angle.

3. A power converter device according to claim 2, wherein the reactive power control means uses the third reference value of the reactive power with respect to the voltage type self-commutated power converter, the D.C. voltage of the D.C. line, a voltage of the second A.C. system, and a reactance between said voltage type self-commutated power converter and second A.C. system to calculate the control factor of pulse width control.

4. A power converter device according to claim 1, wherein the reactive power control means uses the third reference value of the reactive power with respect to the voltage type self-commutated power converter, the D.C. voltage of the D.C. line, a voltage of the second A.C. system, and a reactance between said voltage type self-commutated power converter and said second A.C. system to calculate the control factor of pulse width control.

* * * * *